(12) United States Patent
Sakai et al.

(10) Patent No.: US 7,556,302 B2
(45) Date of Patent: Jul. 7, 2009

(54) PARCEL SHELF STRUCTURE IN REAR AREA OF VEHICLE BODY

(75) Inventors: Hiroyuki Sakai, Saitama (JP); Koichi Takahashi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 12/221,221

(22) Filed: Jul. 31, 2008

(65) Prior Publication Data

US 2009/0033120 A1 Feb. 5, 2009

(30) Foreign Application Priority Data

Aug. 2, 2007 (JP) .............................. 2007-201962

(51) Int. Cl.
*B60R 11/00* (2006.01)
*H05K 5/00* (2006.01)

(52) U.S. Cl. .............................. 296/37.16; 296/203.04; 296/193.08; 181/150

(58) Field of Classification Search .............. 296/37.16, 296/203.04, 193.08; 181/150
See application file for complete search history.

(56) References Cited

U.S. PATENT DOCUMENTS

| 5,416,283 | A | * | 5/1995 | Dault et al. ................. 181/150 |
| 5,652,413 | A | * | 7/1997 | Mulera ....................... 181/141 |
| 6,196,622 | B1 | * | 3/2001 | Brodt et al. ............ 296/203.04 |

FOREIGN PATENT DOCUMENTS

JP 2007-099132 4/2007

* cited by examiner

*Primary Examiner*—Joseph D Pape
(74) *Attorney, Agent, or Firm*—Carrier, Black & Associates, P.C.; William D. Blackman; Joseph P. Carrier

(57) ABSTRACT

A parcel shelf structure in a rear area of a vehicle body includes a parcel shelf disposed between first and second rear cross members. The parcel shelf has in the center thereof a speaker installation section comprised of a bottom part that accommodates a step formed in a downwardly concave manner from a surface of a frame unit of the parcel shelf. The speaker installation section is formed by a peripheral wall that slopes downward from the surface of the frame unit toward the center of the speaker installation section, and the surface area of the speaker installation section is small.

18 Claims, 4 Drawing Sheets

(EMBODIMENT)

PARCEL SHELF STRUCTURE IN REAR AREA OF VEHICLE BODY

FIELD OF THE INVENTION

The present invention relates to a parcel shelf structure disposed in a rear area of a vehicle body and having a parcel shelf provided in the upper portion of a rear side of a rear seatback for partitioning a passenger compartment and a trunk compartment and for allowing disposition of speakers thereon.

BACKGROUND OF THE INVENTION

A sedan-type automobile is ordinarily provided with a parcel shelf structure in the rear portion of a vehicle body behind a rear seat.

A parcel shelf structure for the rear area of a vehicle body is composed of a first rear cross member provided so as to extend in a vehicle width direction along a rear side of an upper portion of the seatback provided to the rear seat, a second rear cross member provided so as to extend in the vehicle width direction along a lower portion of a rear window, and a parcel shelf that is provided between the first and second cross members.

A parcel shelf is a partitioning wall for partitioning a passenger compartment and a trunk compartment.

Speakers of an audio apparatus are provided to this parcel shelf, and reinforcing material is provided to the two sides of the speakers.

A parcel shelf structure is known that reduces parcel shelf vibrations caused by vibrations generated by speakers, by providing reinforcing material in the parcel shelf, as disclosed in, e.g., Japanese Patent Application Laid-Open Publication No. 2007-99132.

However, the parcel shelf structure of the 2007-99132 publication provides a reinforcing member to the parcel shelf in order to reduce parcel shelf vibrations caused by speaker vibration. Accordingly, the number of parcel shelf structure parts is increased, and this hinders cost cutting efforts and weight cutting efforts.

SUMMARY OF THE INVENTION

An object of the present invention is to provide a parcel shelf structure that can reduce parcel shelf vibrations caused by vibrations generated by speakers, and that can also reduce costs and weight.

According to the present invention, there is provided a parcel shelf structure designed to be disposed in a rear part of a vehicle body, which structure comprises: a first rear cross member extending transversely of the vehicle body along a rear side of an upper portion of a rear seatback; a second rear cross member provided rearwardly of the first rear cross member and spaced a predetermined distance from the first cross member; and a parcel shelf provided between the first and second rear cross members for partitioning a passenger compartment and a trunk compartment, the parcel shelf being designed to allow provision of speakers, wherein the parcel shelf comprises a speaker installation section on which a step is formed relative to a surface of the parcel shelf, and a peripheral wall for connecting an external peripheral edge of the speaker installation section to the surface, so that the speakers are allowed to be mounted on the speaker installation section.

Therefore, width and length dimensions of the speaker installation section can be reduced to less than the width and length dimensions of the parcel shelf. Speakers are mounted in the speaker installation section.

Here, the external peripheral edge of the speaker installation section is connected to the surface via the peripheral wall. In other words, the peripheral wall is erected from the external peripheral edge of the speaker installation section, and an angular part is formed by the external peripheral edge and the peripheral wall. The angular part can prevent vibrations of the speaker installation section from being transmitted to the peripheral wall. In other words, when the speaker installation section vibrates, the speaker installation section vibrates with the angular part of the external peripheral edge acting as a support point. Accordingly, the surface area (i.e., vibration surface) of the speaker installation section can be reduced by reducing the width and length dimensions of the speaker installation section. Therefore, vibrations of the speaker installation section (i.e., the parcel shelf) due to vibrations generated by the speakers can be reduced.

In addition, in the present invention, vibrations of the speaker installation section (i.e., the parcel shelf) can be reduced by using a simple configuration in which a stepped speaker installation section is merely provided to the center of the parcel shelf. Accordingly, simplification of the configuration of the parcel shelf can be assured, and costs and weight can also be reduced.

The peripheral wall is a sloping wall that is sloped so as to gradually approach a center of the speaker installation section in progression from the surface toward the speaker installation section. Therefore, the width and length dimensions of the speaker installation section are made even smaller and the surface area of the speaker installation section can be further reduced. Accordingly, vibrations of the speaker installation section (i.e., the parcel shelf) due to vibrations generated by the speakers can be further advantageously reduced.

The speaker installation section has reinforcing beads formed across the space between a pair of opposing walls of the peripheral wall. Accordingly, the rigidity of the speaker installation section can be improved and vibrations of the speaker installation section (i.e., the parcel shelf) due to vibrations generated by the speakers can therefore be further advantageously reduced.

BRIEF DESCRIPTION OF THE DRAWINGS

A preferred embodiment of the present invention will be described in detail below, by way of example only, with reference to the accompanying drawings, in which:

FIG. 4A shows a conventional parcel shelf structure, while

DETAILED DESCRIPTION OF THE PREFERRED EMBODIMENT

In the present embodiment, a parcel shelf having left and right speakers provided on left and right sides of the parcel shelf, respectively, will be described as a typical example in order to simplify understanding of the invention, but the number of speakers and mounting locations are not limited thereto.

Figure 1:
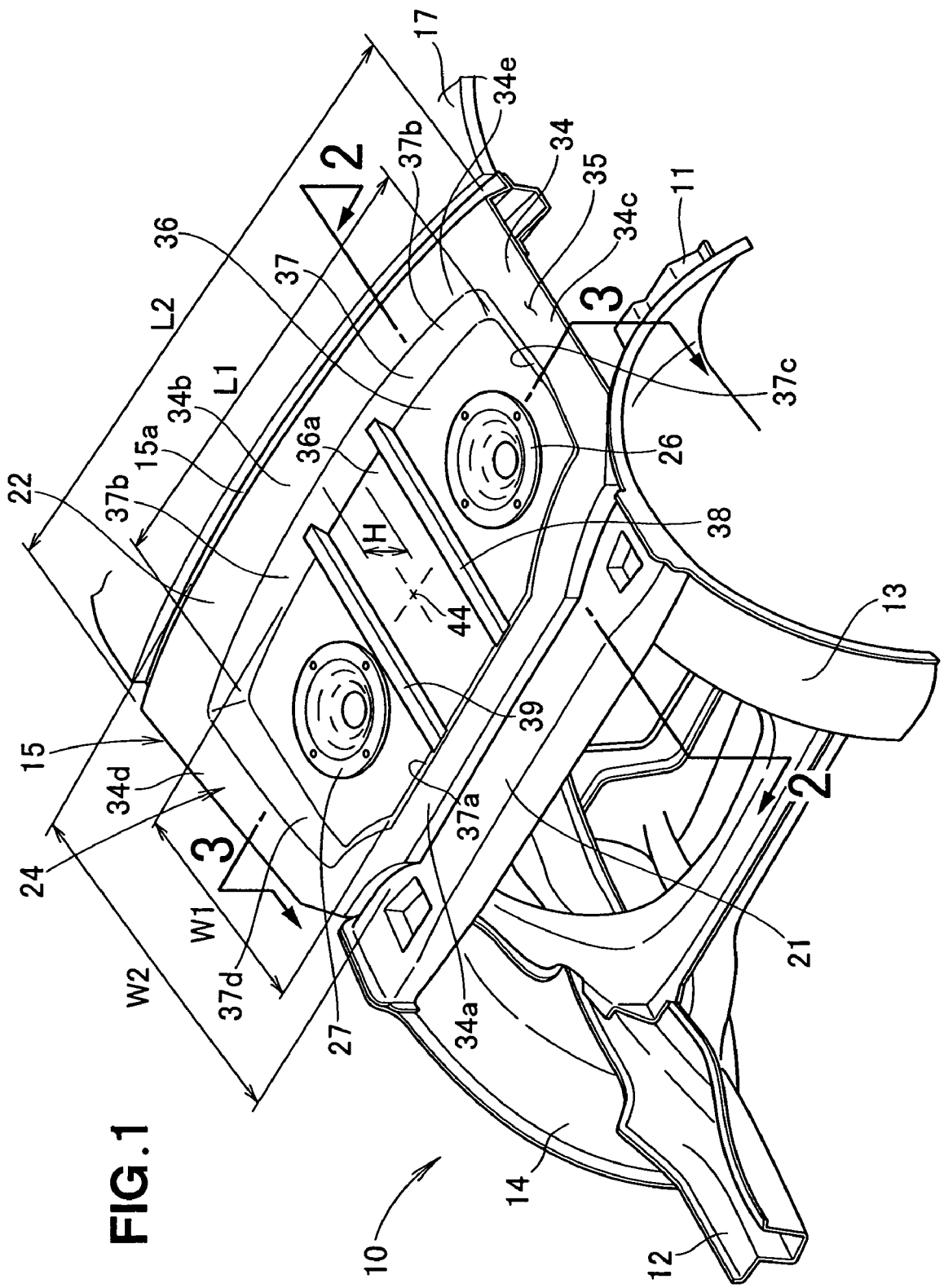
FIG. 1 is a perspective view showing the structure of a rear area of a vehicle body, employing a parcel shelf structure according to the present invention.

A structure 10 of a rear area of a vehicle body has left and right rear side frames 11, 12 to the left and right sides, respectively, of the rear area of the vehicle body, a left wheel housing 13 is provided to the left rear side frame 11; a right wheel housing 14 provided to the right rear side frame 12; a parcel shelf structure 15 (hereinafter abbreviated as "parcel shelf structure") in the rear area of the vehicle body provided rearward of the left and right wheel housings 13, 14; a trunk lid 17 openably and closeably provided to a rear edge portion 15a of the parcel shelf structure 15; and a rear window glass 18 (see FIG. 2) provided to a rear edge portion 15a of the parcel shelf structure 15, as shown in FIG. 1.

The parcel shelf structure 15 has a first rear cross member 21 provided between the left and right wheel housings 13, 14; a second rear cross member 22 provided at a predetermined interval rearward of the first rear cross member 21; a parcel shelf 24 provided across the space between the first and second rear cross members 21, 22; and left and right speakers (speakers) 26, 27 provided to the parcel shelf 24.

Figure 2:
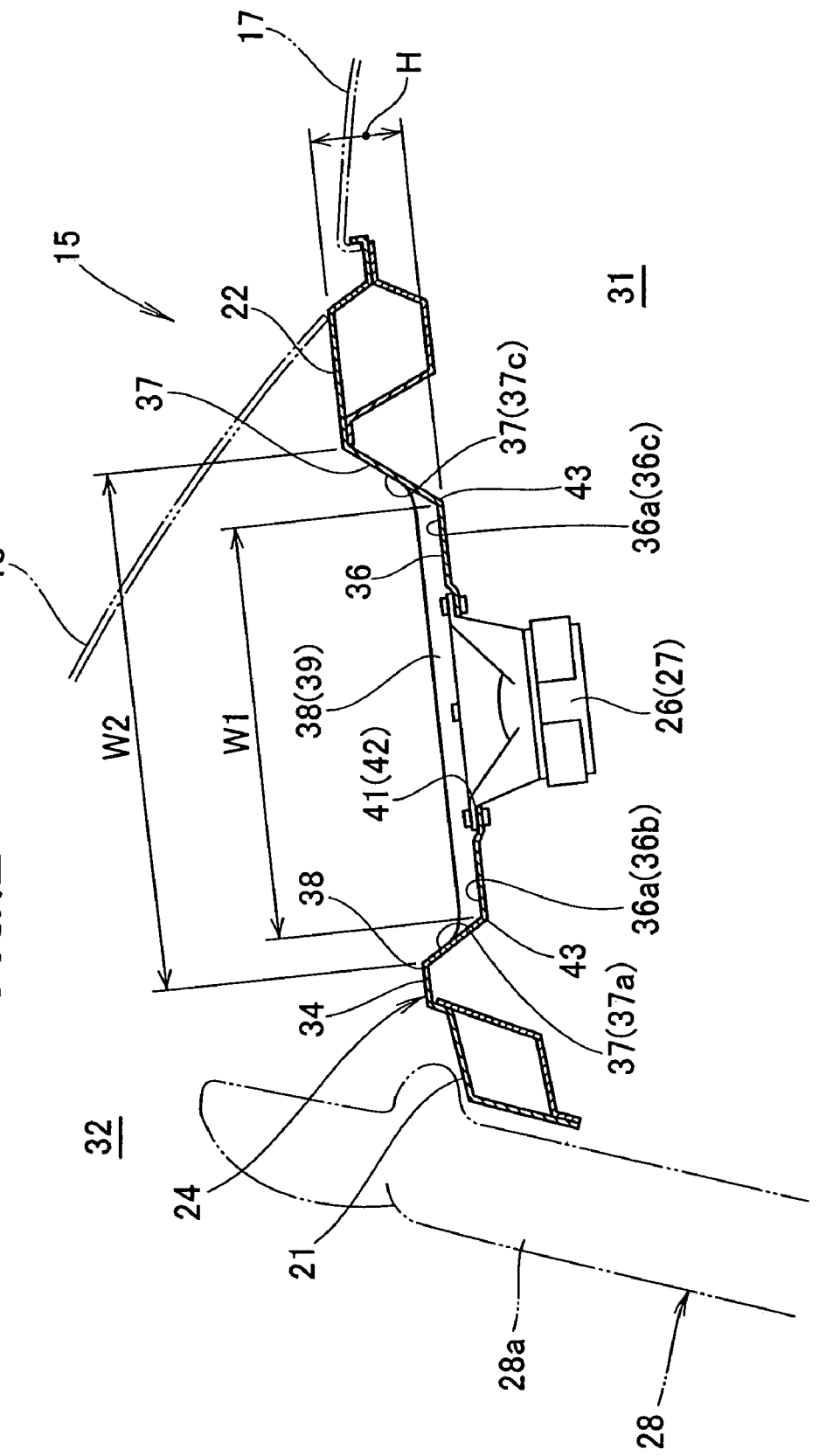
FIG. 2 is a cross-sectional view taken along line 2-2 of FIG. 1.

The first rear cross member 21 is provided along a rear side of an upper portion 28a of a rear seatback 28, as shown in FIG. 2. The rear seatback 28 is a seatback provided to the rear seat of a vehicle.

The second rear cross member 22 is provided above a trunk compartment 31 shown in FIG. 2. The second rear cross member 22 is a member for supporting the trunk lid 17 via a hinge (not depicted), and supporting the rear window glass 18 (see FIG. 2).

The parcel shelf 24 is a panel having a substantially rectangular shape provided substantially horizontally across the space between the first and second rear cross members 21, 22. The parcel shelf 24 is a partitioning wall for partitioning a trunk compartment 31 below and a passenger compartment 32 above.

The parcel shelf 24 is composed of a frame unit 34 connected to the first and second rear cross members 21, 22; a speaker installation section 36 on which a step H is formed on a surface 35 of the frame unit 34; a peripheral wall 37 for connecting an external peripheral edge 36a of the speaker installation section 36 to the surface 35; and left and right reinforcing beads 38, 39 provided to the speaker installation section 36.

Figure 3:
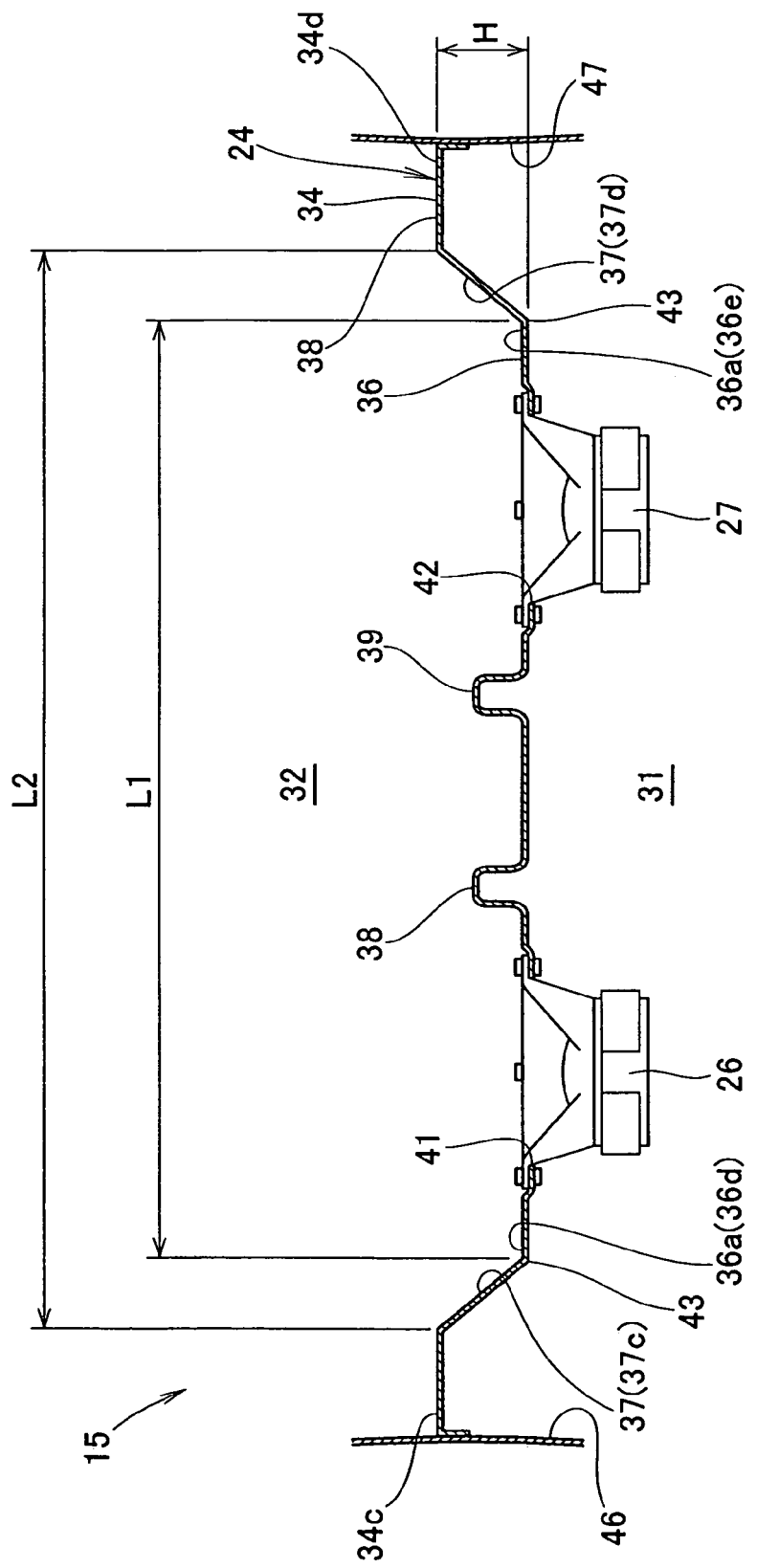
FIG. 3 is a cross-sectional view taken along line 3-3 of FIG. 1.

The frame unit 34 is formed having a substantially rectangular shape, the front frame unit 34a is connected to the first rear cross member 21, the rear frame unit 34b is connected to the second cross member 22, and the left and right side frame units 34c, 34d are provided to the left and right inner panels 46, 47, respectively, of the car body (see FIG. 3).

A speaker installation section 36 is provided to an interior of the frame unit 34, i.e., in a central portion of the parcel shelf 24. The speaker installation section 36 is a flat panel in which a step H is formed in a downwardly concave manner from the surface 35 of the frame unit 34.

The width and length dimensions W1, L1 of the speaker installation section 36 can be reduced to less than width and length dimensions W2, L2, respectively, of the parcel shelf 24 by disposing the speaker installation section 36 in the central portion of the parcel shelf 24. The surface area of the speaker installation section 36 can be reduced by reducing the width and length dimensions W1, L1 of the speaker installation section 36.

Speaker mounting holes 41, 42 (see FIG. 3) are formed on the left and right sides, respectively, of the speaker installation section 36. A left reinforcing bead 38 is formed in the vicinity of the left-side speaker mounting hole 41, and a right reinforcing bead 39 is formed in the vicinity of the right-side speaker mounting hole 42.

A left speaker 26 is mounted in the left-side speaker mounting hole 41, and a right speaker 27 is mounted in the right-side speaker mounting hole 42.

The peripheral wall 37 is erected from the external peripheral edge 36a of the speaker installation section 36, and the upper edge part 37a of the peripheral wall 37 is connected to an internal peripheral edge 34e of the frame unit 34. Therefore, the external peripheral edge 36a of the speaker installation section 36 is connected to the internal peripheral edge 34e of the frame unit 34 at the peripheral wall 37.

The peripheral wall 37 is a rectangularly shaped sloping wall that is sloped so as to gradually approach a center 44 of the speaker installation section 36 in progression from the internal peripheral edge 34e of the frame unit 34 toward the external peripheral edge 36a of the speaker installation section 36. The peripheral wall 37 is composed of front and rear walls 37a, 37b that face each other, and left- and right-side walls 37c, 37d that face each other. The width and length dimensions W1, L1 of the speaker installation section 36 are made even smaller and the surface area of the speaker installation section 36 can be further reduced by making the front and rear walls 37a, 37b and the left- and right-side walls 37c, 37d to be sloping walls.

The left and right reinforcing beads 38, 39 are each extended outward toward the front and rear direction of the vehicle body across the space between the opposing front and rear walls 37a, 37b of the peripheral wall 37. The rigidity of the speaker installation section 36 can be improved by providing the left and right reinforcing beads 38, 39 to the speaker installation section 36.

The speaker installation section 36 is a flat panel provided with a step H that is formed downward in the surface 35 of the frame unit 34, as seen in FIGS. 2 and 3.

The speaker installation section 36 is concavely formed so as to provide a step H relative to the surface 35, whereby the parcel shelf 24 can be formed in a concavo-convex shape and the rigidity of the parcel shelf 24 can be improved.

The speaker installation section 36 is concavely formed so as to have a step H relative to the surface 35. The external peripheral edge 36a of the speaker installation section 36 is connected to the surface 35 via the peripheral wall 37. In other words, the peripheral wall 37 is erected from the external peripheral edge 36a of the speaker installation section 36, and an angular part 43 is formed by the external peripheral edge 36a and the peripheral wall 37. The angular part 43 prevents vibrations of the speaker installation section 36 from being transmitted to the peripheral wall 37. In other words, when the speaker installation section 36 vibrates, the speaker installation section 36 vibrates using the angular part 43 of the external peripheral edge 36a as a support point.

In view of the above, the speaker installation section 36 is concavely formed so as to form a downward step H relative to the surface 35, and the front and rear walls 37a, 37b and the left- and right-side walls 37c, 37d are formed to be sloping walls. Therefore, the width measurement W1 between front and rear rim parts 36b, 36c of the external peripheral edge 36a of the speaker installation section 36 can be reduced.

The length dimension L1 between left- and right-side parts 36d, 36e of the external peripheral edge 36a of the speaker installation section 36 can be reduced. Accordingly, the surface area of the speaker installation section 36 (i.e., the vibration surface area) can be reduced.

Left and right speaker mounting holes 41, 42 are formed on the left and right sides, respectively, of the speaker installation section 36. The left speaker 26 is mounted in the left-side speaker mounting hole 41, and the right speaker 27 is mounted in the right-side speaker mounting hole 42.

When sound is emitted by the left and right speakers 26, 27, vibrations are generated by the left and right speakers 26, 27.

Here, the surface area of the speaker installation section 36 (i.e., the vibration surface area) is reduced. Therefore, vibration of the speaker installation section 36 caused by vibrations generated by the left and right speakers 26, 27 can be reduced.

In this way, vibrations of the speaker installation section 36 (i.e., parcel shelf 24) can be reduced by using a simple configuration in which the stepped speaker installation section 36 is merely provided at the center of the parcel shelf 24. Accordingly, simplification of the configuration of the parcel shelf 24 can be assured, and costs and weight can also be reduced.

Additionally, the left and right reinforcing beads 38, 39 are provided to the speaker installation section 36, as shown in FIG. 3. The left reinforcing bead 38 is integrally press formed so that a predetermined position of the speaker installation section 36 (i.e., a vicinity of the left speaker 26) protrudes in a cross-sectional upside down U-shape. The right reinforcing bead 39, in the same way as the left reinforcing bead 38, is integrally press formed so that a predetermined position of the speaker installation section 36 (i.e., a vicinity of the right speaker 27) protrudes in a cross-sectional upside down U-shape.

The left and right reinforcing beads 38, 39 are integrally press formed on the speaker installation section 36, whereby members for the left and right reinforcing beads 38, 39 do not need to be individually prepared. Accordingly, an increase in the number of parts is reduced and simplification of the parcel shelf 24 configuration can be assured.

The rigidity of the speaker installation section 36 can also be improved by providing the left and right reinforcing beads 38, 39 to the speaker installation section 36. Accordingly, vibration of the speaker installation section 36 (i.e., parcel shelf 24) due to vibrations generated by the left and right speakers 26, 27 can further be advantageously reduced.

Next, vibration of the parcel shelf 24 provided to the parcel shelf structure 15 will be described by comparing an example of the prior art depicted in FIG. 4A with an example of a present embodiment depicted in FIG. 4B.

Figure 4A:
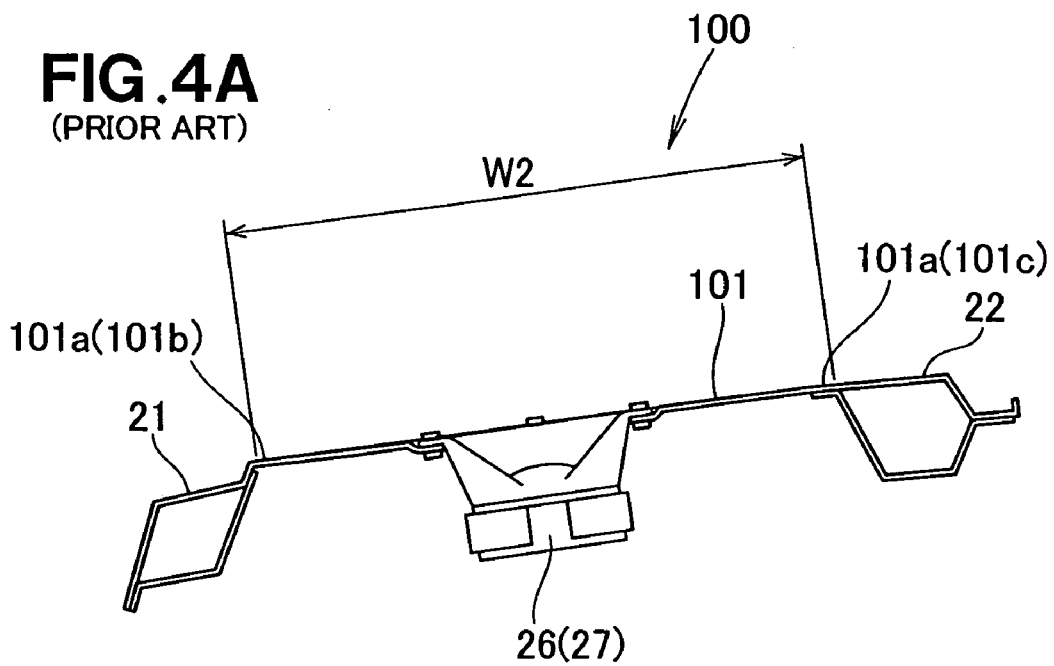

FIG. 4A shows a parcel shelf structure 100 as an example of the prior art in which the entire area of the parcel shelf 24 is flatly formed, and left and right speakers 26, 27 are mounted on the left and right of a parcel shelf 24.

Figure 4B:
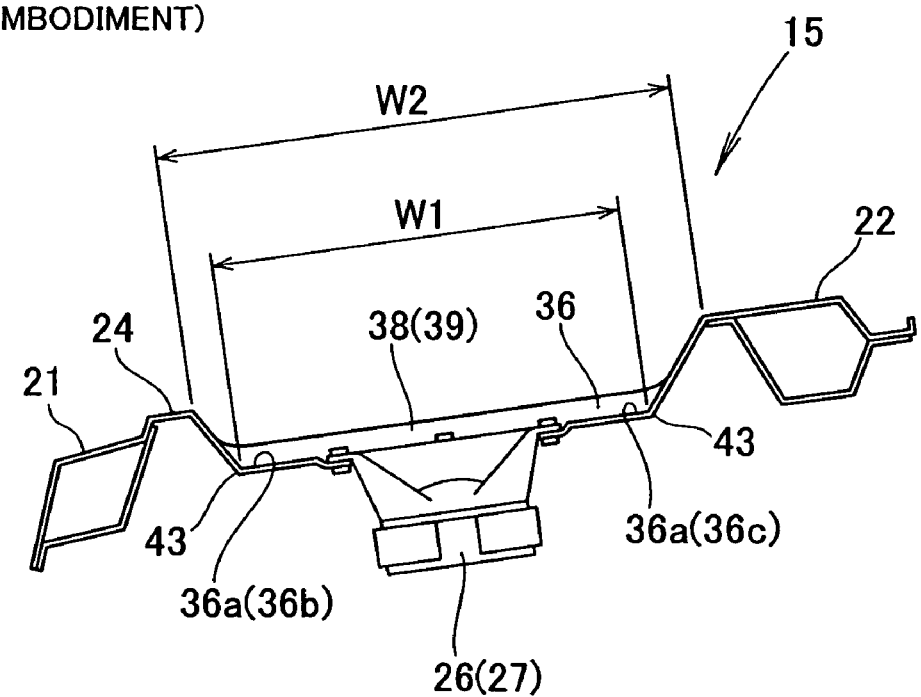
FIG. 4B shows the parcel shelf structure according to the present invention.

FIG. 4B shows a parcel shelf structure 15 described in FIGS. 1 through 3.

The parcel shelf structure 100 of the example of the prior art depicted in FIG. 4A has the entire area of the parcel shelf 101 formed flat.

The parcel shelf 101 is formed having width and length dimensions W2, L2 (length dimension L2 is not depicted), in the same manner as the parcel shelf 24 of the embodiment. The width and length dimensions W2, L2 are large, and therefore the surface area (i.e., vibration surface) in the flat area of the parcel shelf 101 is large.

A front edge portion 101b of an external peripheral edge 101a of the parcel shelf 101 is connected to a first rear cross member 21, and a rear edge portion 101c is connected to a second rear cross member 22. Also, left and right side parts, which are not depicted, of the external peripheral edge 101a are connected to the two sides, respectively, of an inner panel (not depicted).

When vibrations generated by the left and right speakers 26, 27 are transmitted to the parcel shelf 101, the parcel shelf 101 vibrates, having the external peripheral edge 101a as the support point.

Particularly, the surface area (i.e., vibration surface) in the flat area of the parcel shelf 101 is large, and it is believed that the parcel shelf 101 therefore vibrates comparatively greatly and generates vibration sounds.

The parcel shelf structure 15 in FIG. 4B is provided with a speaker installation section 36 on the center of the parcel shelf 24. The speaker installation section 36 is formed having width and length dimensions W1, L1, (see FIG. 3 for length dimension L1). The width and length dimensions W1, L1, are small and therefore the surface area (i.e., vibration surface) of the speaker installation section 36 is small. The surface area of the speaker installation section 36, i.e., the vibration surface is small and the vibration of the speaker installation section 36 can therefore be reduced, even when vibrations generated by the left and right speakers 26, 27 are transmitted to the parcel shelf 24.

Specifically, the speaker installation section 36 can reduce vibrations by using the angular part 43 of the external peripheral edge 36a (i.e., front and rear rim parts 36b, 36c, and left- and right-side parts 36d, 36e) as the support point. Accordingly, even when vibrations caused by the left and right speakers 26, 27 have been transmitted to the parcel shelf 24, the vibrations of the speaker installation section 36 are minimized and the generation of vibration sound can be prevented.

In addition, rigidity of the speaker installation section 36 can be improved by providing left and right reinforcing beads 38, 39 to the speaker installation section 36. Accordingly, vibrations of the speaker installation section 36 (i.e., parcel shelf 24) due to the vibrations generated by the left and right speakers 26, 27 can be further advantageously reduced.

In the above embodiment, an example was described in which left and right speakers 26, 27 were provided to the left and right sides, respectively, of the parcel shelf, but no limitation is imposed thereby, and it is possible also to provide another speaker to the center of the speaker installation section 36 in addition to the left and right speakers 26, 27.

It is also possible not to provide the left and right speakers 26, 27 to the left and right sides of the speaker installation section 36, and to provide a speaker only to the center of the speaker installation section 36.

In the above embodiment, an example was described in which the left and right reinforcing beads 38, 39, are formed in a cross-sectional upside-down U shape, but no limitation is imposed thereby, and it is possible also to form the reinforcing beads, e.g., in a cross-sectional upside-down V shape. It is also possible to suitably alter the number of right and left reinforcing beads 38, 39.

In the embodiment, an example was described in which a speaker installation section 36 was formed so that a step H is provided downward from the surface 35 of the frame unit 34, but no limitation is imposed thereby, and it is also possible to form the speaker installation section 36 so that the step H is provided upward from the surface 35 of the frame unit 34.

The parcel shelf structure of the present invention as described above can be used in a car in which speakers are disposed in a parcel shelf for partitioning the passenger compartment and trunk compartment.

Obviously, various minor changes and modifications of the present invention are possible in light of the above teaching. It is therefore to be understood that within the scope of the appended claims the invention may be practiced otherwise than as specifically described.

What is claimed is:

1. A parcel shelf structure adapted to be disposed in a rear part of a vehicle body, comprising:
   a first rear cross member extending transversely of the vehicle body along a rear side of an upper portion of a rear seatback;

a second rear cross member provided rearwardly of the first rear cross member and spaced at a predetermined distance from the first cross member; and a parcel shelf provided between the first and second rear cross members for partitioning a passenger compartment and a trunk compartment, the parcel shelf being adapted to receive speakers thereon, wherein the parcel shelf comprises:

an upper surface;

a speaker installation section on which a step is formed relative to said upper surface of the parcel shelf such that said speaker installation section is located at a position below said upper surface of the parcel shelf, and an inclined peripheral wall for connecting an external peripheral edge of the speaker installation section to the upper surface of the parcel shelf, so that the speakers are allowed to be mounted on the speaker installation section.

2. The parcel shelf structure of claim 1, wherein the inclined peripheral wall is a sloping wall sloped so as to gradually approach a center of the speaker installation section in progression from the upper surface toward the speaker installation section.

3. The parcel shelf structure of claim 1, wherein the speaker installation section comprises reinforcing beads formed thereon and extending across a space between a pair of opposing walls of the peripheral wall.

4. The parcel shelf structure of claim 1, wherein an angular portion is formed at a position where the external peripheral edge and the peripheral wall intersect with each other;

wherein said angular portion is adapted to minimize transmission of vibrations of speaker, during operation thereof, from the speaker installation section to the inclined peripheral wall;

and wherein said angular portion acts as a support point when the speaker installation section vibrates during operation of the speaker.

5. The parcel shelf structure of claim 1, wherein a width of said speaker installation section is less than an entire width of said parcel shelf.

6. The parcel shelf structure of claim 3, wherein when said parcel shelf is assembled, each of said reinforcing beads has a substantially inverted U-shaped cross section.

7. The parcel shelf structure of claim 6, wherein said speaker installation section has speaker receiving openings formed therein; and wherein said reinforcing beads are press formed on said speaker installation section between said speaker receiving openings.

8. The parcel shelf structure of claim 3, wherein when said parcel shelf is assembled, each of said reinforcing beads has a substantially inverted V-shaped cross section.

9. The parcel shelf structure of claim 8, wherein said speaker installation section has speaker receiving openings formed therein; and wherein said reinforcing beads are press formed on said speaker installation section between said speaker receiving openings.

10. A parcel shelf structure disposed in a rear portion of a vehicle body, comprising:

a first rear cross member extending transversely of the vehicle body along a rear side of an upper portion of a rear seatback;

a second rear cross member disposed rearwardly of the first rear cross member and spaced a predetermined distance from the first cross member; and a parcel shelf disposed between the first and second rear cross members for partitioning a passenger compartment and a trunk compartment, the parcel shelf adapted to receive at least one speaker thereon, wherein the parcel shelf comprises a speaker installation section having at least one speaker receiving hole formed therein; said speaker installation section having a first width;

a mounting section supported by said first and second rear cross members; said mounting section having a second width; and an inclined peripheral wall connecting an outer peripheral edge of said speaker installation section with an inner peripheral edge of said mounting section;

wherein said second width is greater than said first width.

11. The parcel shelf structure of claim 10, wherein the inclined peripheral wall has a predetermined inclination such that, when extended, said peripheral wall approaches a center of the speaker installation section.

12. The parcel shelf structure of claim 10, wherein the speaker installation section comprises reinforcing beads formed thereon.

13. The parcel shelf structure of claim 10, wherein an angular portion is formed at a position where the external peripheral edge of the speaker installation section and the inclined peripheral wall are joined with each other;

wherein said angular portion is adapted to minimize transmission of vibrations of speaker, during operation thereof, from the speaker installation section to said inclined peripheral wall;

and wherein said angular portion acts as a support point when the speaker installation section vibrates during operation of the speaker.

14. The parcel shelf structure of claim 12, wherein when said parcel shelf structure is assembled, each of said reinforcing beads has a substantially inverted U-shaped cross-section.

15. The parcel shelf structure of claim 14, wherein said reinforcing beads are press formed on said speaker installation section.

16. The parcel shelf structure of claim 12, wherein when said parcel shelf is assembled, each of said reinforcing beads has a substantially inverted V-shaped cross-section.

17. A parcel shelf structure adapted to be disposed in a rear part of a vehicle body, comprising:

a first rear cross member extending transversely of the vehicle body along a rear side of an upper portion of a rear seatback;

a second rear cross member provided rearwardly of the first cross member and spaced at a predetermined distance from the first cross member; and a parcel shelf provided between the first and second rear cross members for partitioning a passenger compartment and a trunk compartment, the parcel shelf being adapted to receive at least one speaker thereon, wherein the parcel shelf comprises:

an upper surface;

a speaker installation section on which a step is formed relative to said upper surface of the parcel shelf such that said speaker installation section is located at a position below said upper surface of the parcel shelf, and a peripheral wall for connecting an external peripheral edge of the speaker installation section to the upper surface of the parcel shelf, so that said at least one speaker is allowed to be mounted on the speaker installation section, wherein said installation section comprises at least one reinforcing bead thereon across a space between a pair of opposing wall portions of the peripheral wall so as to define between said at least one reinforcing bead and said peripheral wall an area for mounting of said at least one speaker.

18. The parcel shelf structure of claim 17, wherein the parcel shelf is adapted to receive a plurality of speakers thereon, and the speaker installation section comprises a plurality of reinforcing beads formed thereon and extending across said space between said pair of opposing wall portions of the peripheral wall, wherein each bead cooperates with an associated wall portion to define an area therebetween for mounting of a respective one of the speakers.

* * * * *